(12) United States Patent
Witzke et al.

(10) Patent No.: US 7,230,207 B2
(45) Date of Patent: Jun. 12, 2007

(54) HEATABLE EXTERNAL MIRROR FOR MOTOR VEHICLES

(75) Inventors: Michael Witzke, Ansbach (DE); Jorg Scholler, Ergersheim (DE); Heinrich Lang, Ergersheim (DE)

(73) Assignee: Lang-Mekra North America LLC, Ridgeway, SC (US)

( * ) Notice: Subject to any disclaimer, the term of this patent is extended or adjusted under 35 U.S.C. 154(b) by 0 days.

(21) Appl. No.: 11/105,758

(22) Filed: Apr. 14, 2005

(65) Prior Publication Data

US 2006/0016795 A1    Jan. 26, 2006

(30) Foreign Application Priority Data

Jul. 20, 2004    (DE)    .................. 10 2004 035 022

(51) Int. Cl.
*B60L 1/02*    (2006.01)
*H05B 3/00*    (2006.01)

(52) U.S. Cl. ...................... 219/219; 219/202

(58) Field of Classification Search .............. 219/219, 219/201–203
See application file for complete search history.

(56) References Cited

U.S. PATENT DOCUMENTS

| | | | | |
|---|---|---|---|---|
| 3,323,241 A | * | 6/1967 | Blair et al. ................. | 40/450 |
| 3,831,165 A | * | 8/1974 | Chivian et al. ............. | 345/214 |
| 4,634,835 A | * | 1/1987 | Suzuki ........................ | 349/195 |
| 4,983,810 A | * | 1/1991 | Balderson ................. | 219/445.1 |
| 5,446,576 A | * | 8/1995 | Lynam et al. .............. | 359/267 |
| 5,808,777 A | * | 9/1998 | Lynam et al. .............. | 359/265 |
| 5,925,593 A | * | 7/1999 | Salgado et al. ............ | 503/201 |
| 6,426,485 B1 | | 7/2002 | Bulgajewski et al. | |
| 6,592,255 B1 | * | 7/2003 | Duroux et al. ............. | 374/162 |
| 6,717,109 B1 | * | 4/2004 | Macher et al. ............. | 219/219 |
| 2002/0154379 A1 | * | 10/2002 | Tonar et al. ................ | 359/267 |
| 2004/0079743 A1 | * | 4/2004 | White ........................ | 219/202 |

FOREIGN PATENT DOCUMENTS

| | | |
|---|---|---|
| DE | 199 21 880 A 1 | 11/2000 |
| DE | 199 22 778 A 1 | 11/2000 |
| EP | 0 989 392 A1 | 3/2000 |
| GB | 2332466 A * | 6/1999 |
| JP | 10113262 A * | 5/1998 |

OTHER PUBLICATIONS

European Search Report Oct. 7, 2005.

* cited by examiner

*Primary Examiner*—Vinod D. Patel
(74) *Attorney, Agent, or Firm*—McNair Law Firm, P.A.

(57) ABSTRACT

A heatable external rearview mirror including a mirror housing for attachment to the vehicle and a mirror pane with a reflecting surface carried in the housing. A heating element is located adjacent the mirror pane for heating the pane to remove precipitation. A thermochromic heating indicator is provided in heat conducting contact with at least one of the heating element and the mirror pane that reacts to temperature changes for detecting heating of the mirror pane by the heating element and providing a visual indication of the operation of the heating element.

9 Claims, 5 Drawing Sheets

HEATABLE EXTERNAL MIRROR FOR MOTOR VEHICLES

BACKGROUND OF THE INVENTION

1. Field of the Invention

The present invention relates to automotive mirror assemblies, and more specifically, to a heatable external rearview mirror for motor vehicles that includes a thermochromic heating indicator for detecting heating of the mirror pane by a heating element and providing a visual indication of the operation of the heating element.

2. Description of Related Art

To design external rearview mirrors for motor vehicles so as to be heatable is known, so that condensate, frost, snow, ice, etc. may be removed by heating the mirror pane by means of a heating element in order to obtain an unobstructed field of vision to the rear through the mirror. Typically, the heating elements are made of surface heating elements extending essentially all across the expanse of the mirror pane at its back side with a mirror housing. It is also known to actuate the heating element in heatable rearview mirrors by means of a thermostatic switch, i.e. that the thermostatic switch closes the power circuit going to the heating element so as to actuate it when a predetermined outside temperature has been reached.

As a result of the mirror heating system or the heating element being switched on and off automatically by the thermostatic switch, the driver of a vehicle equipped with one or several of these mirrors may often find it difficult to recognize whether the mirror heating system has already been automatically switched on or not. What often occurs is that the mirror pane becomes "blind" due to condensation, etc., while the thermostatic switch has however not yet switched on because the temperature for this may not yet be low enough for it. Also, the thermostatic switch may have switched on just before checking the visibility of the mirror but no result is yet visible in the short time since the moment of being switched on because the mirror pane could not yet be heated up sufficiently. In such cases the mirror heating system is then usually switched on manually by the driver, but this additional action by the driver is often unnecessary in instances when the thermostatic switch has switched on just before checking the visibility conditions of the mirror, while no results are yet visible because the mirror pane could not yet be heated up sufficiently.

For the driver of a motor vehicle equipped with one or several heatable rearview mirrors it is therefore desirable to know whether the automatic mirror heating system on a condensation-covered or "blind" mirror has already switched on for the removal of this condensation or not, so that he may override the thermostatic switch if necessary and switch on the heating element by means of a separate switch. Especially on commercial vehicles it is also customary for the mirror heating system to be actuated and de-actuated only manually.

It is known to provide optical heating indicators to avoid overheating of the mirror surface and any resulting damage to the mirror or injury to persons touching the overheated mirror. In this context DE 19922778 discloses the installation of a heating indicator in the form of an LED within the heating circuit that is visible in the mirror. In this manner the operation of the mirror heating system is displayed optically. The disadvantage of this is that the LED must be built into the heating circuit. Because of different heating currents when using PTC elements as heating system, this results in excessively different influences on the LED and thereby different degrees of lightness. In addition, this LED does not indicate the effectiveness of the mirror heating system but merely its operation. In cases of a short-circuit in the surface heating element, the LED lights up even thought the functionality of the mirror heating system is insufficient. In addition, retrofitting existing mirror systems with such technology is difficult.

It is therefore an object of the present invention to create a heatable external mirror with a heating indicator, in particular a heatable rearview mirror for motor vehicles which displays the function and effectiveness of the mirror heating system.

SUMMARY OF THE INVENTION

The above objective is accomplished according to the present invention by providing a heatable external rearview mirror for a vehicle which is comprised as disclosed herein below. The heatable external rearview mirror includes a mirror housing for attachment to the vehicle and a mirror pane with a reflecting surface carried in the housing. A heating element is located adjacent the mirror pane for heating the pane to remove precipitation. A thermochromic heating indicator is provided in heat conducting contact with at least one of the heating element and the mirror pane that reacts to temperature changes for detecting heating of the mirror pane by the heating element and providing a visual indication of the operation of the heating element.

In one advantageous embodiment of the invention, the thermochromic heating indicator includes a thermochromic material that changes color based on changes in temperature.

In an alternative embodiment, the thermochromic heating indicator includes a thermochromic material that changes light transmissivity based on changes in temperature so that at a predetermined elevated temperature turns the thermochromic material transparent to allow light to pass, and a predetermined lower temperature turns the thermochromic material opaque to block light passage. Preferably, a colored marker is disposed behind the thermochromic heating indicator for viewing when the thermochromic material turns transparent.

In another embodiment, the thermochromic heating indicator may be carried on a back side of the mirror pane within the housing, and the reflecting surface in an area adjacent the thermochromic heating indicator is at least partially removed so that a front side of the mirror pane acts as an indicator surface to display the thermochromic heating indicator. Preferably, the indicator surface is provided with an optical enhancing structure that influences the optical appearance of the thermochromic heating indicator to improve the visual indication. In one embodiment, the optical enhancing structure is a prism.

In a further advantageous embodiment, the thermochromic heating indicator may be made from one of a thermochromic plastic and thermochromic foil. The thermochromic foil may be carried on one of a back side and a front side of the mirror pane. In one embodiment, the thermochromic foil is placed in heat conducting contact with the heating element within the housing and extends out of the housing to provide the visual indication. In a further embodiment, the thermochromic plastic is formed as an optical enhancing structure placed on a front side of the mirror pane to improve the visual indication.

Further details, aspects and advantages of the present invention are derived from the following description, on hand of the drawing, of an embodiment given purely as a non-limiting example.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION OF A PREFERRED EMBODIMENT

Figure 1A:
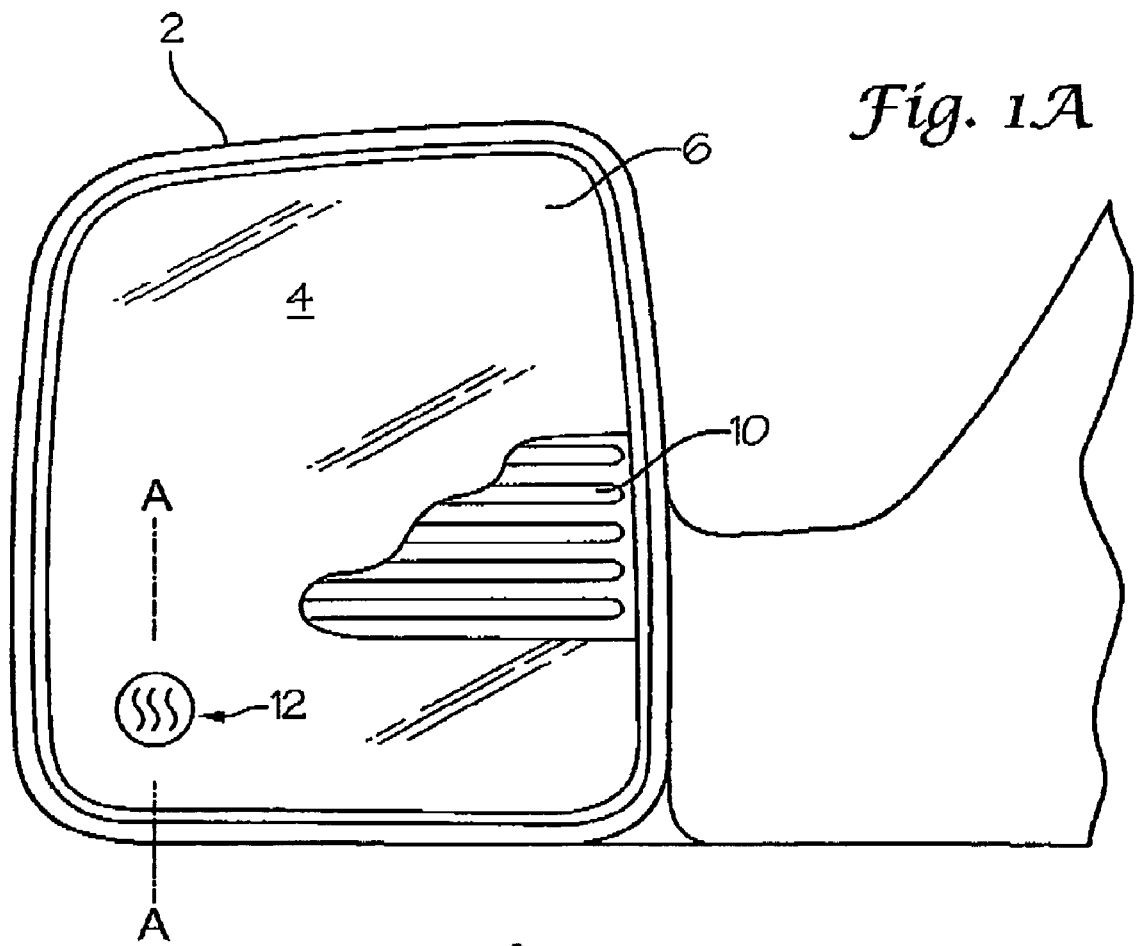
FIGS. 1a and 1b show a first embodiment of the invention.
Figure 1B:
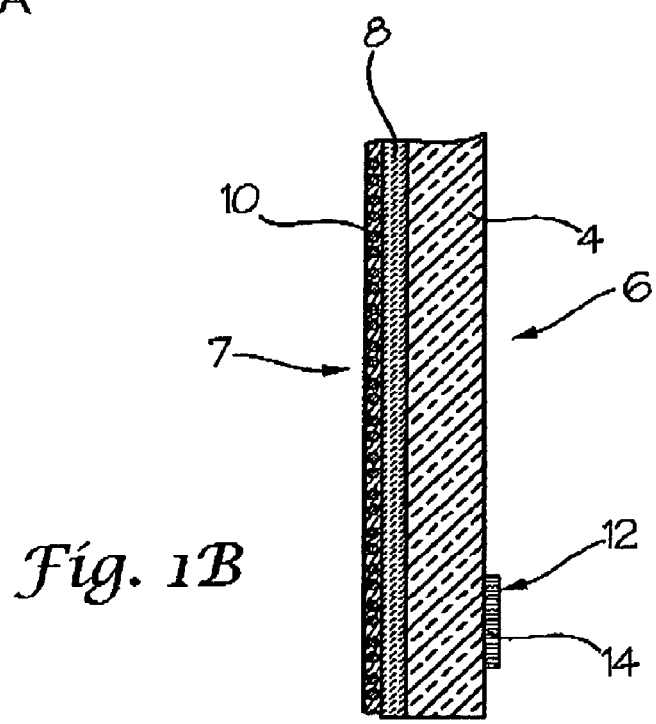

With reference to the drawings, the invention will now be described in more detail. FIGS. 1a and 1b show a first example of an embodiment of the invention in form of a heatable external rearview mirror for motor vehicles. The heatable rearview mirror comprises a mirror housing 2 carrying a mirror pane 4 including a front side 6 facing out of housing 2, and a back side 7 facing into housing 2. The front side 6 lies within the field of vision of a driver. As can be seen in particular in the sectional view of FIG. 1b, the mirror pane 4 comprises a reflecting surface 8, preferably applied on back side 7. An electric heating device in form of a surface heating element is installed on reflecting surface 8. A heating indicator is place in heat conducting contact with the mirror pane on front side 6, i.e. the side of the mirror pane 4 that is visible to the driver. The heating indicator is a thermochromic heating indicator, designated generally as 12, that contains thermochromic material which may be provided in the form of a thermochromic foil 14, thermochromic plastic and thermochromic gels. Preferably, thermochromic colors or varnishes reacting with a change in color to temperature changes may be used. Alternatively, the thermochromic heating indicator may include a thermochromic material that changes light transmissivity based on changes in temperature so that at a predetermined elevated temperature turns the thermochromic material transparent to allow light to pass, and a predetermined lower temperature turns the thermochromic material opaque to block light passage.

Thermochromic foil 14 reacts to temperature changes by changing its color. If the mirror heating system 10 is in operation, the temperature of mirror pane 4 increases, resulting in a change in color of the thermochromic foil 14 and thereby to an optical display of the function of the mirror heating system 10.

Alternatively, as noted above, it is also possible to use a thermochromic material that reacts to temperature changes with a change in transmissivity. Preferably, a colored marker is disposed behind the thermochromic heating indicator for viewing when the thermochromic material turns transparent. If the heating device 10 is not in operation, the thermochromic foil 14 is made to appear as a black surface on mirror pane 4.

Figure 2:
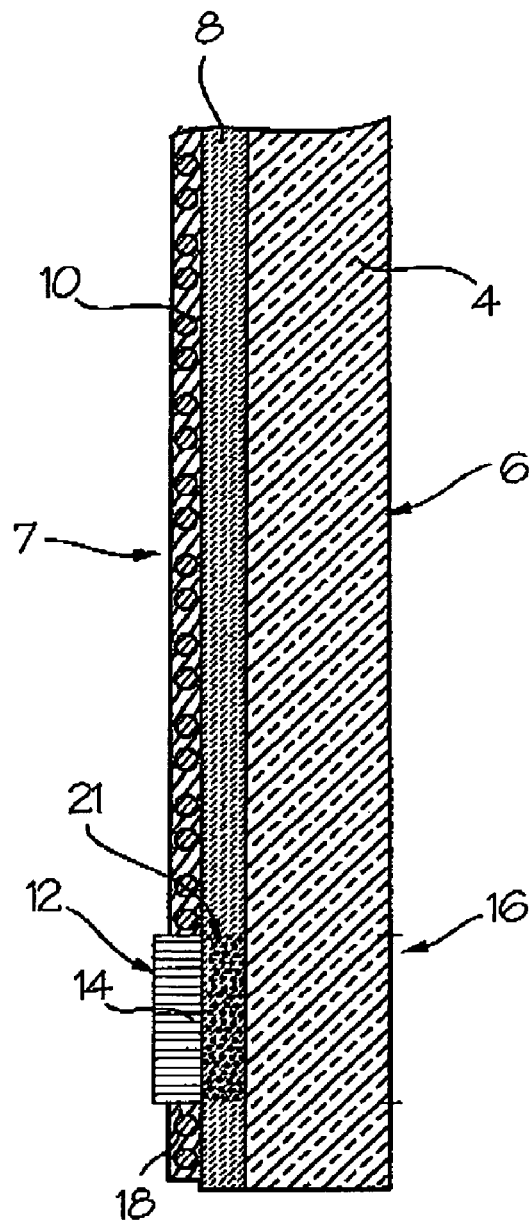
FIG. 2 shows a second embodiment of the invention.

FIG. 2 shows a second embodiment of the invention in a drawing similar to FIG. 1b which is different from the embodiment of FIG. 1 in that thermochromic heating indicator 12, depicted as thermochromic foil 14, is not located on front side 6 of mirror pane 4, but in a recess 18 in heating element 10 on reflecting surface 8. The surface on front side 6 of the mirror pane 4 acts as an indicator surface 16. To ensure that the change in color is visible from front side 6 of mirror pane 4 at indicator surface 16, reflecting surface 8 is removed or at least thinned in the area in which the thermochromic foil 14 is installed to allow the driver to view thermochromic heating indicator 12.

Figure 3:
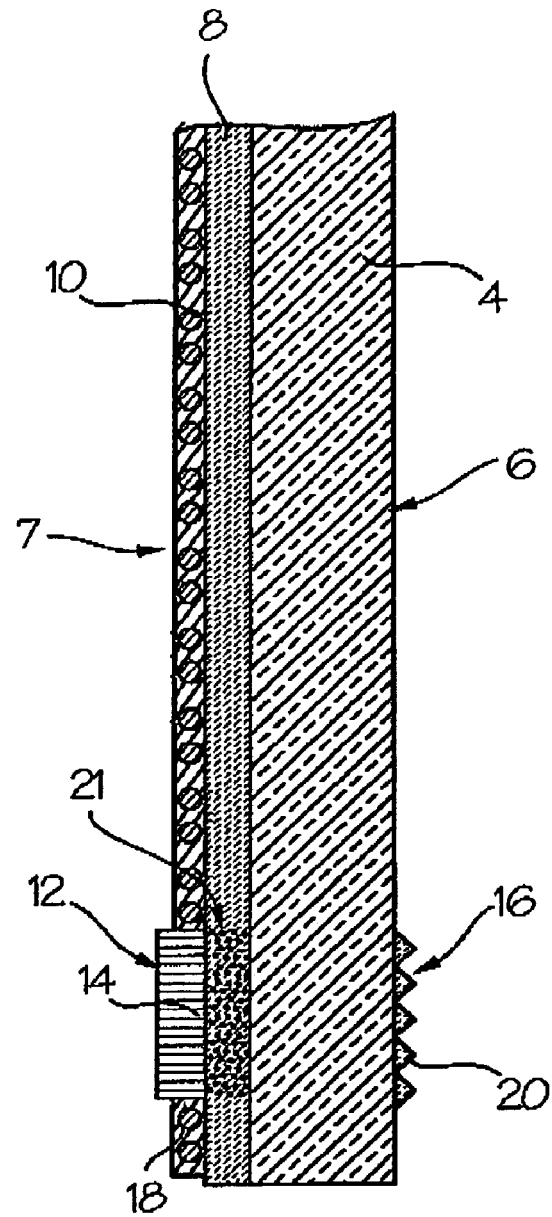
FIG. 3 shows a third embodiment of the invention.

FIG. 3 shows a third embodiment of the invention differentiated from the embodiment of FIG. 2 in that in addition an optical enhancing surface structure 20, preferably in the form of small prisms, is provided on front side 6 of mirror pane 4 in the area of indicator surface 16. The prisms 20 improve the visibility of thermochromic heating indicator 12. Alternatively a Fresnel lens structure may be provided to enhance visibility. This optical enhancing structure is possible in particular in optical heating indicators in the form of elements made of a thermochromic plastic, i.e. the optical enhancing structure is integrated into the thermochromic heating indicator 12.

Figure 4:
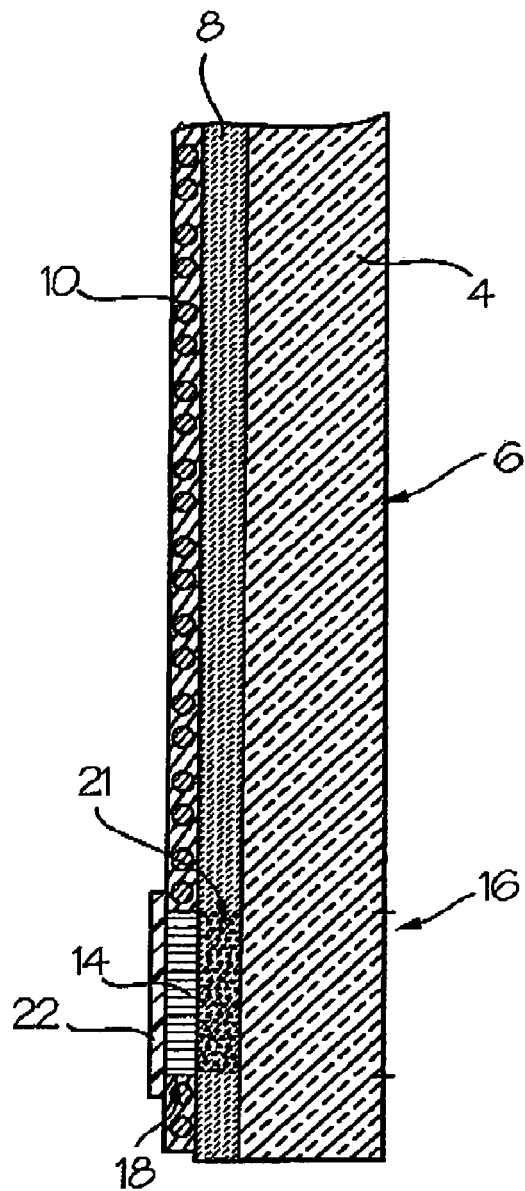
FIG. 4 shows a fourth embodiment of the invention.
Figure 5:
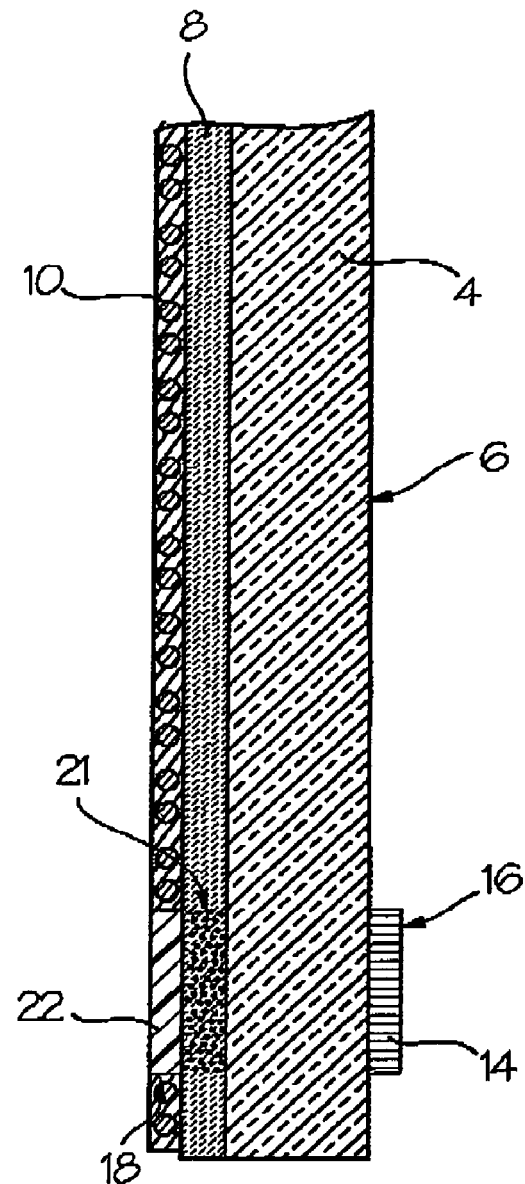
FIG. 5 shows a fifth embodiment of the invention.

FIG. 4 shows a fourth embodiment with the same basic structure as the second embodiment according to FIG. 2, but thermochromic foil 14 reacts by changing in transmissivity and not by changing color in response to temperature changes. When thermochromic materials are used that react to temperature changes with a change in their transmissivity, a prominent marking, e.g. in form of a neon color surface is preferably provided behind or under the thermochromic material, becoming visible beneath the thermochromic material at higher temperature of the mirror surface. As illustrated in FIGS. 4 and 5, behind thermochromic foil 14 with changing transmissivity, a neon-colored marker strip 22 is installed that becomes visible from front side 6 through mirror pane 4 when the transmissivity of thermochromic foil 14 changes to be transparent as a result of an increase in temperature caused by heating element 10.

FIG. 5 shows a fifth embodiment of the invention which differentiates itself from the embodiment of FIG. 4 in that the thermochromic foil 14 with changing transmissivity is located on front side 6 of mirror pane 4. Reflecting layer 8 is thinned or removed, indicated generally by reference number 21, beneath colored marker strip 22 so that the colored marking 22 mounted in recess 18 of heating element 10 becomes visible from the outside of mirror pane 4 as thermochromic foil 14 turns transparent.

Figure 6A:
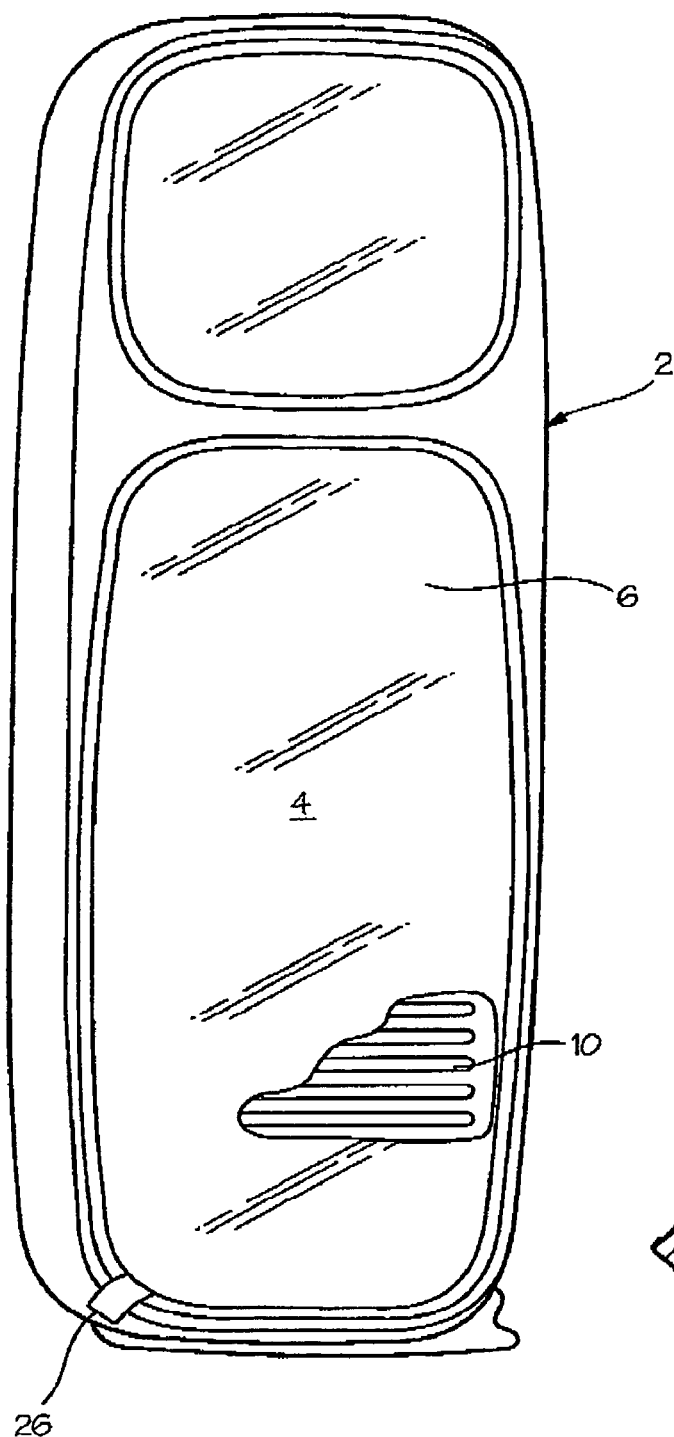
FIGS. 6a and 6b show a sixth embodiment of the invention.
Figure 6B:
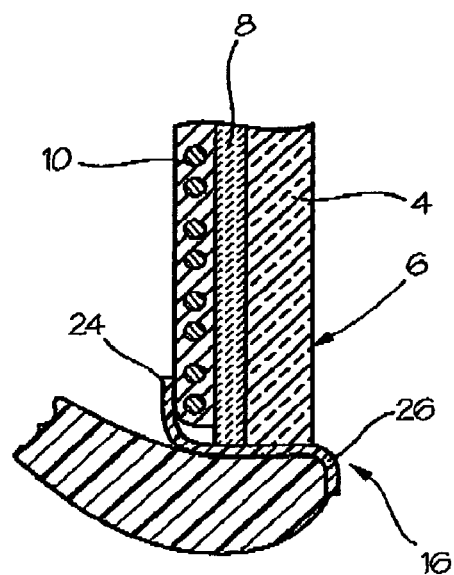

FIGS. 6a and 6b show a sixth embodiment of the invention, where a strip 24 of thermochromic foil is placed in heat conducting contact with the back surface heating element 10 and extends between mirror housing 2 and mirror pane 4 outward to the area of the mirror housing that is visible with front side 6 of mirror pane 4. Portion 26 of thermochromic strip 24 is visible from front side 6 and acts as an indicator surface 16 for displaying operation of heating element 10. In the area in which thermochromic strip 24 is not visible, a material with good heat conductivity can be used alternatively. In the sixth embodiment, it is advantageous that frost, ice or condensation water does not cover indicator surface 16 or portion 26 of the thermochromic strip at front side 6 of mirror pane 4.

Figure 7:
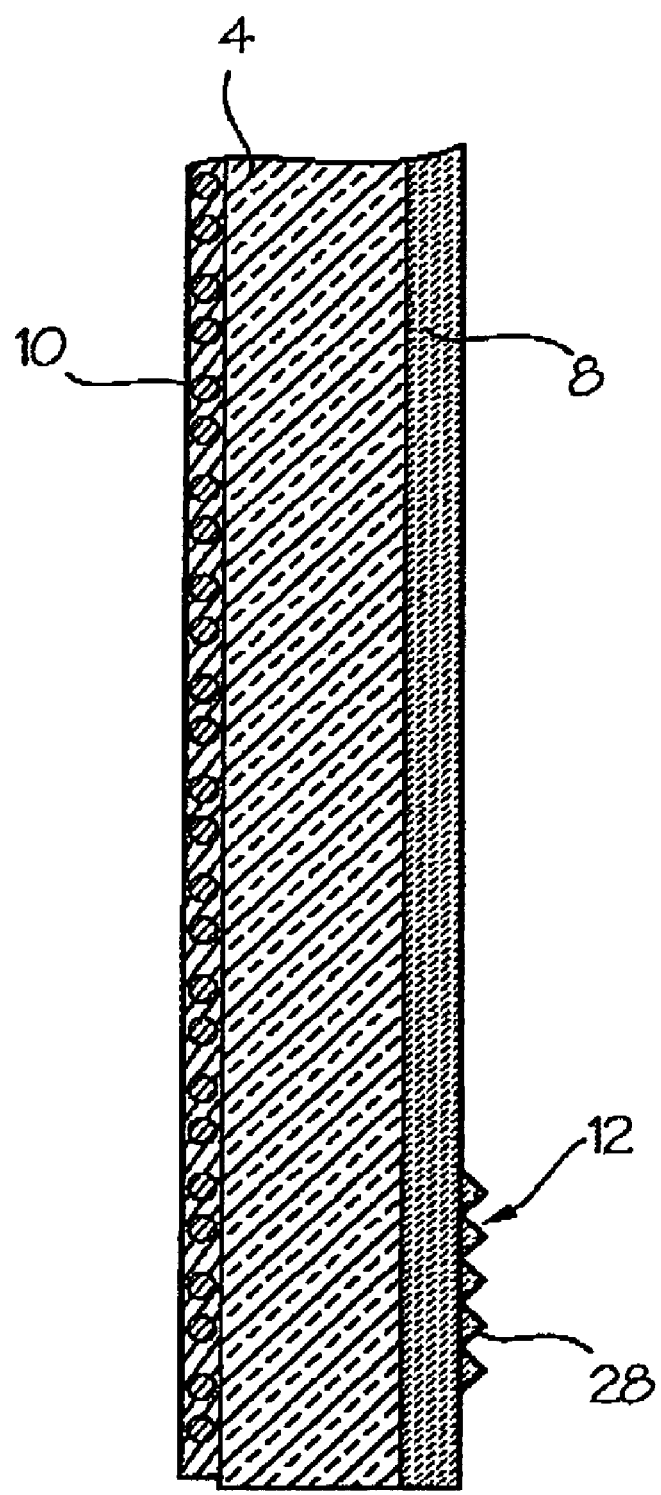
FIG. 7 shows a seventh embodiment of the invention.

FIG. 7 shows a schematic representation of a seventh embodiment of the invention where reflecting surface 8 is provided on front side 6 of mirror pane 4. The surface heating element 10 is installed at back side 7. The thermochromic heating indicator 12 in provided in the form of an optical enhancing structured element 28 made of thermochromic plastic and installed on reflective surface 8. Alternatively, a thermochromic heating indicator 12 of the various types detailed above can be used without optical enhancing structure 28.

In each of the embodiments according to FIGS. 1 thru 6, mirrors with reflective coatings 8 on back side 7 of mirror pane 4 are shown. Instead of these rear surface reflecting mirrors and in accordance with the embodiment according to FIG. 7, it is also possible to use frontal surface reflecting mirrors. In the embodiments according to FIGS. 1 to 6 it is also possible to use elements made of thermochromic plastic with and without optical enhancing structures instead of the thermochromic foil 14.

LIST OF REFERENCE NUMBERS

2 Mirror holder
4 Mirror pane
6 Front side of mirror pane
7 Back side of mirror pane
8 Reflecting surface
10 Heating element
12 Thermochromic heating indicator
14 Thermochromic foil
16 Indicator surface
18 Recesses in heating element
20 Optical enhancing structure/prisms
22 Colored marker strip
24 Thermochromic foil strip
26 Visible portion of 24
28 Thermochromic plastic with optical structure While a preferred embodiment of the invention has been described using specific terms, such description is for illustrative purposes only, and it is to be understood that changes and variations may be made without departing from the spirit or scope of the following claims.

What is claimed is:

1. A heatable external rearview mirror for a vehicle comprising:
    a mirror housing for attachment to the vehicle;
    a mirror pane with a reflecting surface carried in said housing;
    a heating element adjacent said mirror pane for heating said pane to remove precipitation;
    a thermochromic heating indicator selected from one of a thermochromic plastic and thermochromic foil being in heat conducting contact with said heating element and changing color based on temperature changes of said heating element; and,
    an external indicator tab included in said thermochromic heating indicator that extends out of said housing from said heating element to provide a visual indication of the operation of said heating element.

2. The external rearview mirror of claim 1 wherein said thermochromic heating indicator includes a thermochromic material that changes light transmissivity based on changes in temperature so that at a predetermined elevated temperature said thermochromic material turns transparent to allow light to pass, and a predetermined lower temperature turns said thermochromic material opaque to block light passage.

3. The external rearview mirror of claim 2 including a colored marker disposed behind said thermochromic heating indicator for viewing when said thermochromic material turns transparent.

4. The external rearview mirror of claim 1 wherein said thermochromic heating indicator includes an optical enhancing structure placed on a front side of said mirror pane to improve said visual indication.

5. A heatable external rearview mirror for a vehicle comprising:
    a mirror housing for attachment to the vehicle;
    a mirror pane carried in said housing with a reflecting surface disposed on a back side of said mirror pane;
    a heating element carried adjacent said reflecting surface for heating said mirror pane to remove precipitation;
    a thermochromic heating indicator carried by said heating element adjacent said reflecting surface for changing color based on temperature changes of said heating elements to provide a visual indication that said heating element is operating; and,
    wherein said reflecting surface adjacent said thermochromic heating indicator is at least partially removed to exposed said thermochromic heating indicator so that a portion of a front side of said mirror pane acts as an indicator surface to display said thermochromic heating indicator.

6. The external rearview mirror of claim 5 wherein said indicator surface includes an optical enhancing structure in the form of a prism that influences the optical appearance of said thermochromic heating indicator to improve visual indication.

7. A heatable external rearview mirror for a vehicle comprising:
    a mirror housing for attachment to the vehicle;
    a mirror pane generally disposed in said housing with a reflecting surface disposed on a back side of said mirror pane;
    a heating element carried adjacent said reflecting surface for heating said mirror pane to remove precipitation; and,
    a thermochromic heating Indicator in heat conducting contact with at least one of said heating element and said mirror pane that changes light transmissivity based on temperature changes so that a predetermined elevated temperature turns said indicator transparent, and a predetermined lower temperature turns said indicator opaque; and,
    a colored marker disposed behind said thermochromic heating indicator for displaying through said indicator surface when said thermochromic heating indicator turns transparent;
    whereby, said thermochromic heating indicator detects heating of said mirror pane by said heating element and provides a visual indication of the operation of said heating element.

8. The external rearview mirror of claim 7 wherein said thermochromic heating indicator is carried on said back side of said mirror pane within said housing, and wherein said reflecting surface in an area adjacent said thermochromic heating indicator is at least partially removed so that a portion of a front side of said mirror pane acts as an indicator surface to display said thermochromic heating indicator.

9. The external rearview mirror of claim 7 wherein said thermochromic heating indicator is carried on a front side of said mirror pane, and said colored marker is carried on said back side of said mirror pane generally disposed behind said thermochromic heating indicator, and wherein said reflecting surface in an area between said thermochromic heating indicator and said colored marker is at least partially removed for allowing said colored marker to display through said thermochromic heating indicator when transparent.

* * * * *